United States Patent
Takata et al.

(10) Patent No.: US 9,221,196 B2
(45) Date of Patent: Dec. 29, 2015

(54) METHOD OF MANUFACTURING OPTICAL COMPONENT AND APPARATUS FOR MANUFACTURING OPTICAL COMPONENT

(75) Inventors: Atsushi Takata, Yokohama (JP); Masanobu Ogane, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 13/226,642

(22) Filed: Sep. 7, 2011

(65) Prior Publication Data

US 2012/0061865 A1    Mar. 15, 2012

(30) Foreign Application Priority Data

Sep. 9, 2010  (JP) .................................. 2010-202047

(51) Int. Cl.
  *B29D 11/00*  (2006.01)
  *B29B 13/02*  (2006.01)
  *B29C 35/08*  (2006.01)

(52) U.S. Cl.
  CPC ........... *B29B 13/023* (2013.01); *B29C 35/0805* (2013.01); *B29D 11/00432* (2013.01); *B29C 2035/0822* (2013.01)

(58) Field of Classification Search
  CPC ................... B29C 35/0805; B29C 2035/0822; B29D 11/00432; B29B 13/023
  USPC ........ 264/1.1, 1.36, 2.5, 492, 493; 425/174.4, 425/175, 808
  See application file for complete search history.

(56) References Cited

U.S. PATENT DOCUMENTS

| | | | |
|---|---|---|---|
| 2005/0158419 A1* | 7/2005 | Watts et al. | 425/174.4 |
| 2005/0172671 A1* | 8/2005 | Yoneda et al. | 65/64 |
| 2006/0157897 A1* | 7/2006 | Suzuki et al. | 264/492 |

FOREIGN PATENT DOCUMENTS

| | | |
|---|---|---|
| CN | 1402666 A | 3/2003 |
| CN | 101161441 A | 4/2008 |
| CN | 101780699 A | 7/2010 |
| JP | S57-070608 A | 5/1982 |
| JP | 2095813 A | 4/1990 |
| JP | 7-148857 * | 6/1995 |
| JP | H09-278456 A | 10/1997 |
| JP | 3169786 B2 | 5/2001 |
| JP | 2001-158044 A | 6/2001 |

* cited by examiner

*Primary Examiner* — Mathieu Vargot
(74) *Attorney, Agent, or Firm* — Canon USA Inc. IP Division (57) ABSTRACT

A method of manufacturing an optical component includes, bringing a mold including at least one portion made of an infrared transmitting material into tight contact with a substrate, heating the substrate by irradiating the substrate with an infrared ray in a state that a gap is present between the substrate and the mold, and placing the mold and the substrate into tight contact with each other.

11 Claims, 11 Drawing Sheets

|  | RESIN | | METAL | | INFRARED TRANSMITTING MATERIAL | |
|---|---|---|---|---|---|---|
|  | PC | COC | IRON | COPPER | QUARTZ | SILICON |
| THERMAL CONDUCTIVITY [W/m·K] | 0.2 | 0.2 | 84 | 390 | 1.4 | 148 |

○ CHANGE IN SURFACE TEMPERATURE    □ DIFFERENCE IN TEMPERATURE BETWEEN SURFACE AND INTERNAL

MOLDING SURFACE

METHOD OF MANUFACTURING OPTICAL COMPONENT AND APPARATUS FOR MANUFACTURING OPTICAL COMPONENT

BACKGROUND OF THE INVENTION

1. Field of the Invention

The present invention relates to a method of manufacturing an optical component such as a lens and an apparatus for manufacturing the optical component.

2. Description of the Related Art

Optical components made of resin are usually manufactured by injection molding, press molding, or a similar method.

In injection molding, a molten plasticized resin material is filled in a cavity of a mold and is then cooled, whereby a molded product with a desired shape is obtained. Since the resin material is cooled by the transfer of heat from the resin material to the mold, a surface portion of the resin material that is in contact with the mold solidifies initially and an inner portion thereof then solidifies gradually. In this course, cooling shrinkage occurs; hence, a surface portion of the molded product that has solidified initially is high in density and an inner portion thereof is low in density.

When the molded product is an optical component for transmitting light like a lens, there is a problem in that the molded product has reduced optical performance due to the internal density distribution and birefringence of the molded product that are caused by shrinkage. Furthermore, there is a problem in that the molding time is long because the resin material is entirely melted and cooling takes a long time.

In press molding, a plate or a substrate having a shape similar to a final desired shape is prepared. The plate or substrate is placed into a mold heated to a temperature sufficient to mold the substrate, and is then pressed, whereby the shape of the mold is transferred to the substrate. The substrate is cooled by cooling the mold. Therefore, there is a problem in that the molding time is long because press molding takes a longer time for heating and cooling than injection molding.

In order to solve these problems, machines and a method described below have been proposed. Japanese Patent Laid-Open No. 2-95813 (hereinafter referred to as Patent Document 1) discloses a press molding machine including a substrate transmitting no ultraviolet light, a mold transmitting ultraviolet light, and an ultraviolet irradiator placed behind the mold. The substrate is heated in such a manner that the substrate is irradiated with ultraviolet light through the mold. After a surface portion of the substrate is melted, the substrate is pressed against the mold, whereby transfer is performed.

Japanese Patent No. 3169786 (hereinafter referred to as Patent Document 2) discloses an injection molding machine that includes a mold having a cavity and a non-transferable zone made of an infrared transmitting material and also includes a light source emitting infrared light. The non-transferable zone is irradiated with infrared light during injection, whereby the viscosity of resin placed on non-transferable zone is reduced.

Japanese Patent Laid-Open No. 2001-158044 (hereinafter referred to as Patent Document 3) discloses a molding method in which a transfer surface of a substrate is irradiated with infrared light through a stamp made of an infrared transmitting material in such a state that the stamp is in tight contact with the substrate. Since resin located near the transfer surface absorbs infrared light, the temperature thereof increases and therefore the viscosity thereof reduces. However, the stamp transmits infrared light and therefore the temperature thereof hardly increases.

In each of Patent Documents 1 to 3, a surface of the substrate is heated by making use of the fact that the mold transmits ultraviolet or infrared light, which is absorbed by resin, and the mold, which is made of the ultraviolet or infrared light transmitting material, and the substrate, which is made of resin, has extremely lower thermal conductivity as compared with metals. The heating of the substrate surface reduces the viscosity of resin located near the transfer surface to increase the transferability thereof. The temperature of the mold can be kept low and therefore the molding time can be reduced.

The techniques disclosed in Patent Documents 1 to 3 have the effect of increasing the transferability of a substrate by heating a surface of the substrate with infrared or ultraviolet light. Since sufficient transferability is achieved even though the temperature of a mold is kept low, these techniques also have the effect of reducing the time taken for cooling, that is, the molding time.

Infrared transmitting materials such as quartz have higher thermal conductivity as compared with common resins. Therefore, in the case of using the technique disclosed in Patent Document 2 or 3, most of the heat of a surface portion of resin heated with infrared light is dissipated through a mold because the resin is in contact with the mold.

Conventional techniques have the effect of increasing the transferability of substrates by heating surfaces of the substrates and are, however, incapable of intensively heating the substrate surfaces. That is, the substrates are entirely melted by heating. Therefore, density distribution and birefringence are caused in molded products during cooling and solidification, leading to a problem with a reduction in optical performance. Furthermore, the use of ultraviolet light as a light source deteriorates resin to cause a reduction in optical performance.

SUMMARY OF THE INVENTION

One aspect of the present invention provides a method of manufacturing an optical component and an apparatus for manufacturing such an optical component. In the method and apparatus, an infrared transmitting mold and an infrared irradiator are used as heating units and the molding time is reduced and the optical performance of a molded product is improved by intensively heating a surface of a substrate.

Another aspect of the present invention provides a method of manufacturing an optical component. The method includes, bringing a mold including at least one portion made of an infrared transmitting material towards a substrate; heating the substrate by irradiating the substrate with an infrared ray in a state that a gap is present between the substrate and the mold, bringing the heated substrate and the mold into tight contact with each other.

A further aspect of the present invention provides an apparatus for manufacturing an optical component. The apparatus includes a mold including at least one portion made of an infrared transmitting material, an infrared irradiator configured to irradiate a substrate with an infrared ray through the mold, a shutter that opens or closes to control the irradiation of the substrate with the infrared ray emitted from the infrared irradiator, a substrate support configured to retain the substrate, and a position controller configured to relatively move the mold and the substrate support.

According to at least one embodiment of the present invention, the time taken for heating and cooling can be reduced by intensively heating a surface of a substrate. That is, the molding time can be reduced. Since an inner portion of the substrate can be prevented from being heated, the density distribution and birefringence of the substrate can be prevented from varying during molding. Furthermore, when the substrate is a near shaped gob that has been reduced in density distribution and birefringence by annealing, an optical component having a small density distribution, low birefringence, and high optical performance can be prepared from the substrate.

Further features of the present invention will become apparent to persons having ordinary skill in the art from the following description of exemplary embodiments with reference to the attached drawings.

DESCRIPTION OF THE EMBODIMENTS

First Embodiment

Figure 1A:
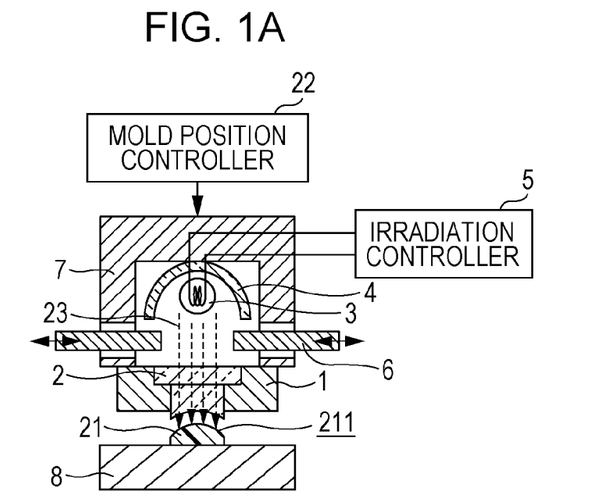
FIGS. 1A and 1B are illustrations of an apparatus for manufacturing an optical component according to a first embodiment the present invention.
Figure 1B:
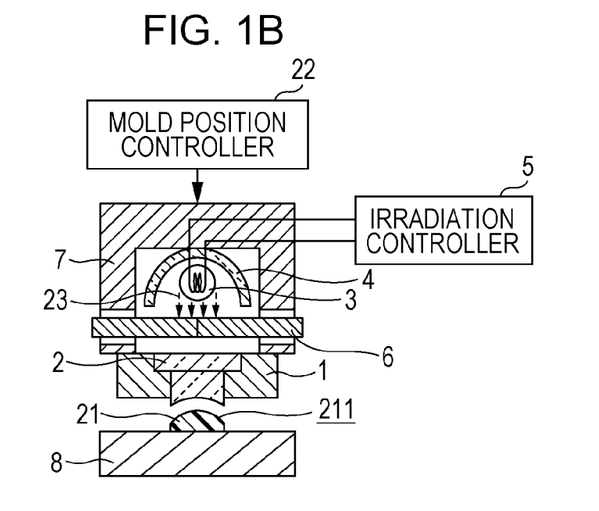

FIG. 1 is a schematic view of a press molding machine corresponding to an apparatus for manufacturing an optical component according to a first embodiment the present invention. With reference to FIG. 1, reference numeral 2 represents a mold including at least one portion made of an infrared transmitting material (for example, quartz glass). The mold 2 is retained with a mold support 1 and is attached to a press unit 7. The press unit 7 includes an infrared irradiator 3 including a carbon lamp. An infrared ray 23 (may also be referred to as infrared beam or infrared light) emitted from the infrared irradiator 3 is directed to the mold 2 by a condenser mirror 4 and is thereby applied to a substrate 21 made of resin.

The intensity of the infrared ray 23 is controlled with an irradiation controller 5 and the irradiation of the substrate 21 with the infrared ray 23 is controlled by the switching operation of a shutter 6 in an on/off manner.

In this embodiment, the press unit 7 is moved with a mold position controller 22, whereby a gap between the substrate 21 and the mold 2 and/or the force of pressing the substrate 21 against the mold 2 is controlled.

The substrate 21 is a near shaped gob that has been reduced in density distribution and birefringence by annealing in advance. As used herein the term "gob" will be given its ordinary meaning, but can be preferably interpreted as a lump of a viscous substance. The near shaped gob preferably has a predefined shape similar to the surface shape of the desired optical component, which is a final product having a transfer surface transferred from the mold 2. The use of the near shaped gob, which has low density distribution and birefringence, allows for the fabrication of a molded product with high optical performance. The substrate 21 may be made of a plastic material such as PC, COC, COP, PMMA, MS; a glass material; a glass material covered with a plastic material; or a first plastic material covered with a second plastic material.

Figure 10A:
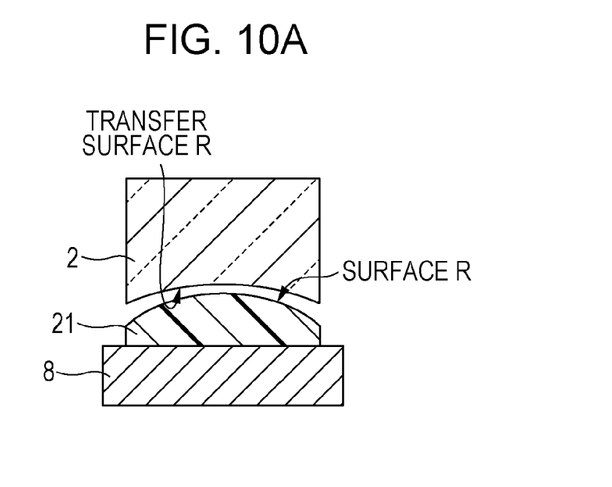
FIGS. 10A and 10B are illustrations of the relationship between the shape of a mold and the shape of a substrate.
Figure 10B:
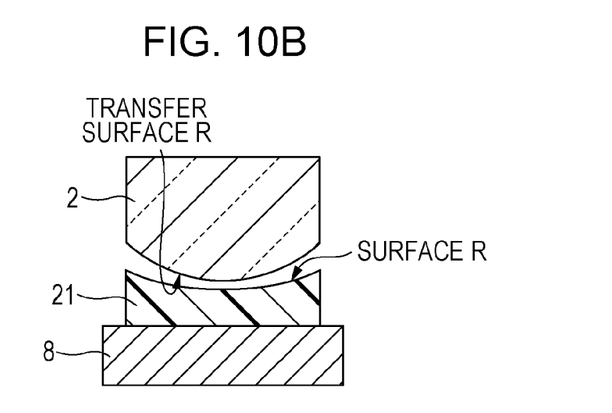

The substrate 21 has a predefined shape as that shown in FIG. 10A or 10B. When a surface of the substrate 21 is convex or concave, the surface of the substrate 21 has a radius of curvature less than the radius of curvature of a transfer surface of the mold 2 or a radius of curvature greater than the radius of curvature of the transfer surface of the mold 2, respectively. This allows a portion of a surface of the substrate 21 to be initially transferred, the portion being on a press axis, and allows the transfer surface of the mold 2 to expand when the transfer surface of the mold 2 is brought into tight contact with and pressed against the substrate 21. In addition, this allows for a non-uniform gap to be formed between the transfer surface R of the mold 2 and an outer surface R of the substrate 21. In other words, a portion of the substrate aligned with the press axis and closest to the mold comes first into contact with the mold, and the remainder surface of the mold and the substrate gradually come into contact as the gap therebetween is slowly closed until the mold and the substrate are placed in tight contact with each other. Thus, molding can be completed without causing any air accumulation between the mold and the substrate, and therefore an optical component with high form accuracy can be obtained.

A method of manufacturing an optical component according to this embodiment will now be described.

As shown in FIG. 1B, before manufacturing steps are started, the shutter 6 is closed and the infrared irradiator 3 is turned on in advance. Since the infrared irradiator 3 takes several seconds to several minutes to start up, the infrared irradiator 3 is turned on in advance. This allows the substrate 21 to be constantly supplied with steady-state energy after the shutter 6 is opened.

After the substrate 21 is set on a substrate support 8 and molding is then started, the press unit 7 is moved downward with the mold position controller 22 and the mold 2 approaches the substrate 21. The press unit 7 stops the mold 2 when a gap between the mold 2 and a surface 211 of the substrate 21 approaches a predetermined value (for example, 500 µm) on the press axis. The press axis extends in a direction in which the mold 2 is pressed against the substrate 21, that is, the moving direction of the mold position controller 22 in this embodiment. An optical member with higher optical performance can be obtained in such a manner that the mold 2 and the substrate 21 are arranged such that the optical axis of the optical component is aligned with the press axis.

Figure 4:
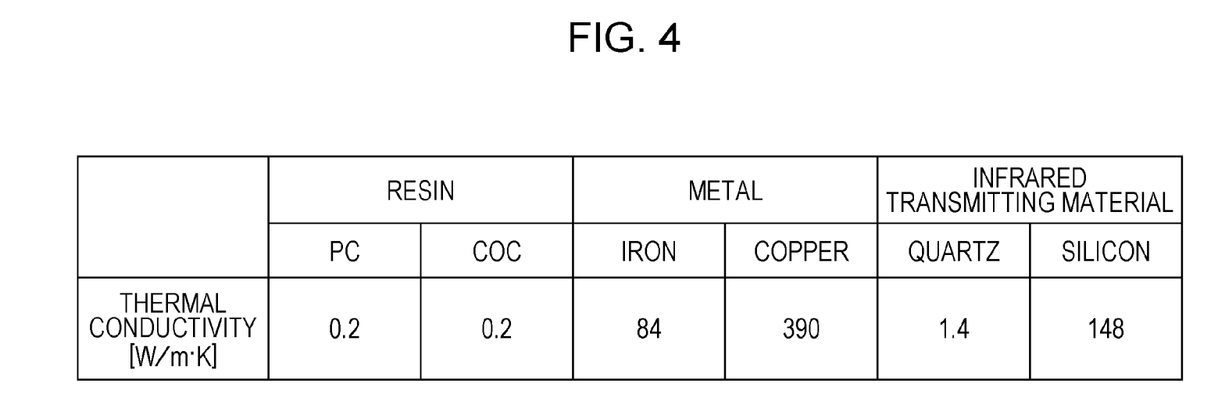
FIG. 4 is an illustration of the thermal conductivity.

The substrate 21 is irradiated with the infrared ray 23 through the mold 2 by opening the shutter 6, whereby the surface 211 of the substrate 21 is heated. A predetermined gap (for example, a 500 μm gap) is present between the mold 2 and the surface 211 of the substrate 21 and therefore gas present in the gap serves as a heat insulating layer to prevent the transfer of heat from the surface 211 of the substrate 21 to the mold 2. As shown in FIG. 4, resins have lower thermal conductivity as compared with metals and infrared transmitting materials; hence, the heat transfer in the substrate 21 is low. Therefore, the surface 211 of the substrate 21 can be intensively heated with internal heat generation minimized. The gap between the mold 2 and the substrate 21 during heating is herein referred to as the gap during heating.

After the surface 211 of the substrate 21 reaches a predetermined temperature, the mold 2 is brought into contact with the surface 211 of the substrate 21. The predetermined temperature is preferably equal to or higher than a moldable temperature that is 25° C. or more higher than the glass transition temperature (Tg) of the substrate 21. Just before the surface 211 of the substrate 21 reaches the predetermined temperature, the mold 2 is moved close to the surface 211 of the substrate 21 at a predetermined speed (for example, 0.5 mm/s) and the gap between the mold 2 and the surface 211 of the substrate 21 is maintained at a predetermined value (for example, 100 μm or less), whereby a pressing step can be readily performed after heating. After the surface 211 of the substrate 21 reaches the predetermined temperature, the shutter 6 is closed, whereby the heating of substrate 21 is stopped. The speed of moving the mold 2 close to the surface 211 of the substrate 21 is herein referred to as the approach speed. The gap between the surface 211 of the substrate 21 and the mold 2 moved close thereto is herein referred to as the gap during approach. The approach speed may be arbitrary and is preferably high because the moving time of the mold 2 is short. The gap during approach may be less than the gap during heating and is preferably small because the moving time of the mold 2 is short.

After heating, the mold 2 is brought into contact with the substrate 21 at a predetermined speed (for example, 0.02 mm/s) and then pressed against the surface 211 of the substrate 21 with the mold position controller 22, whereby the shape of the transfer surface of the mold 2 is transferred to the surface 211 of the substrate 21. The substrate 21 is cooled during transferring. Since the thermal conductivity of the mold 2 is sufficiently greater than that of the substrate 21, the heat of the surface 211 of the substrate 21 is quickly transferred to the mold 2 and therefore the internal temperature of the substrate 21 can be prevented from being increased. The speed of bringing the mold 2 into contact with the substrate 21 is herein referred to as the speed during contact.

After the substrate 21 is sufficiently cooled, the mold 2 is moved upward with the mold position controller 22 so as to be separated from the substrate 21 and the molded substrate 21 is then taken out. The optical component is manufactured as described above.

In this embodiment, it is exemplified that the mold 2 is moved toward the substrate 21 with the mold position controller 22. The present invention is not limited to this embodiment. The substrate support 8 may be configured to be movable such that the substrate 21 is moved toward the mold 2. Alternatively, the mold position controller 22 and the substrate support 8 may be configured to be movable such that the mold 2 and the substrate 21 are moved relatively to each other.

The mold 2 is preferably made of quartz glass which transmits infrared light with a wavelength of 4 μm or less and which is excellent in processability and may be made of an infrared transmitting material other than quartz glass. The mold 2 may be made of, for example, one selected from the group consisting of quartz glass, silicon, $CaF_2$, $MgF_2$, $BaF_2$, Ge, ZnSe, ZnS, KBr, and sapphire or a mixture of two or more selected from this group.

Figure 5:
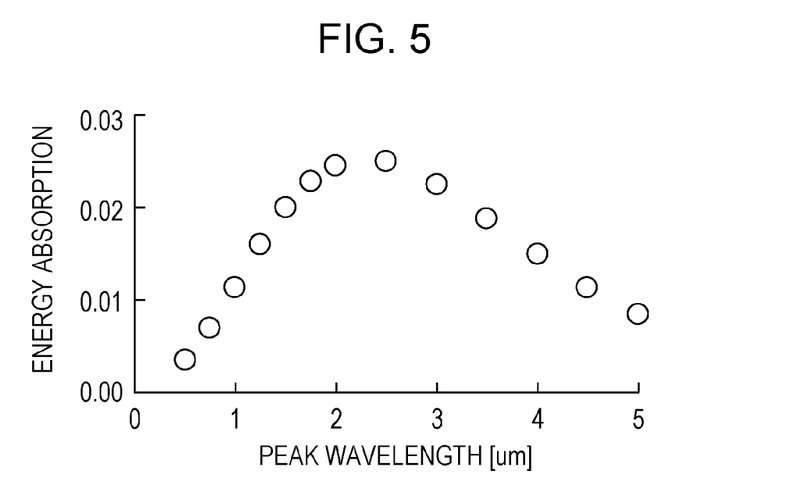
FIG. 5 is an illustration of the relationship between the peak wavelength of an infrared lamp and the energy absorption of a surface of a substrate.

The infrared irradiator 3 preferably includes the carbon lamp. FIG. 5 shows the relationship between the peak wavelength of an infrared lamp and the energy absorption of a 50 μm thick surface layer of the substrate 21 as determined by numerical calculation. When the peak wavelength thereof is 1 μm to 4 μm, the energy absorption of the surface layer of the substrate 21 is high. This is effective in intensively heating the surface 211 of the substrate 21. The peak wavelength of the carbon lamp is about 2 μm and coincides with the absorption wavelength of the substrate 21 and therefore the carbon lamp is suitable for heating the substrate 21. The infrared irradiator 3 may include a halogen lamp, Kanthal heater, or ceramic heater having a peak wavelength of 1 μm to 4 μm instead of the carbon lamp.

Figure 11:
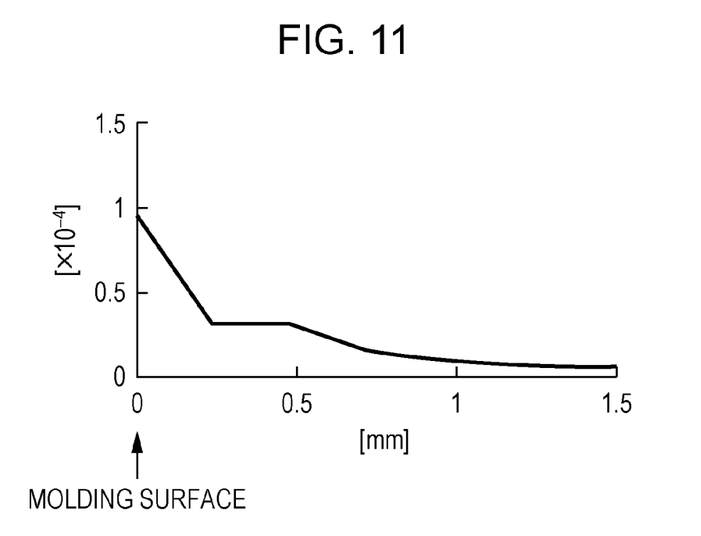
FIG. 11 is an illustration of the density distribution on a press axis of an optical component.

The substrate 21 is the near shaped gob. The near shaped gob preferably has a shape similar to a final molded product and a form error of 300 μm or less with respect to the mold 2. FIG. 11 shows measurements of the density distribution on the press axis of a molded product that is a type of optical component. A surface of the molded product has a large density distribution. A region where the density distribution varies is a portion of the molded product that extends about 300 μm from the surface of the molded product. The region where the density distribution varies corresponds to a region processed in a molding step. The molding of near shaped gobs having a form error of more than 300 μm causes increases in density distribution and varying region. Therefore, the use of the near shaped gob, which has a form error of 300 μm or less with respect to the transfer surface of the mold 2, allows an optical component with high optical performance to be obtained.

A molding surface of the substrate 21 may be curved or flat depending on the shape of the mold 2.

Figure 6:
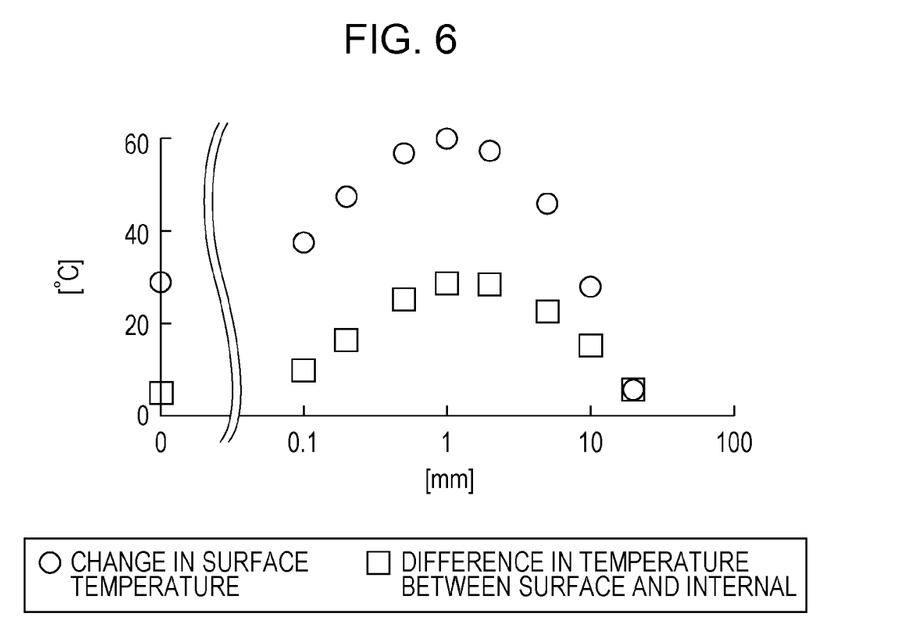
FIG. 6 is an illustration of the relationship between a gap between a mold and a substrate and the change in temperature of the substrate.
Figure 7A:
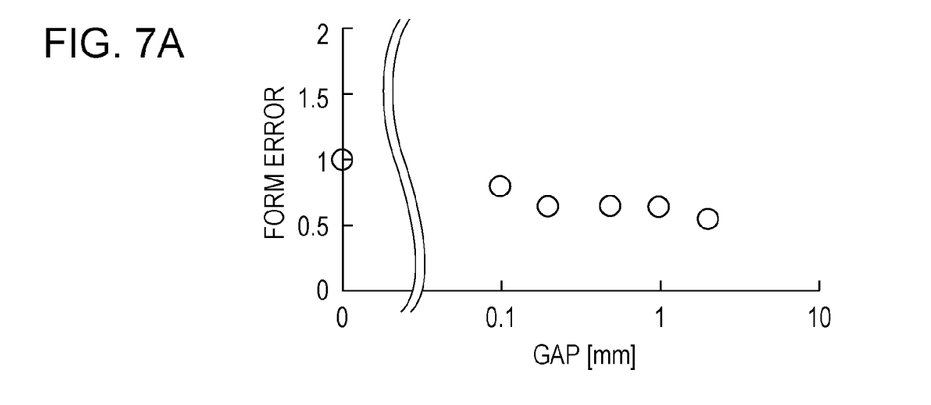
FIGS. 7A-7C are illustrations of the relationship between a gap between a mold and a substrate and an optical component.
Figure 7B:
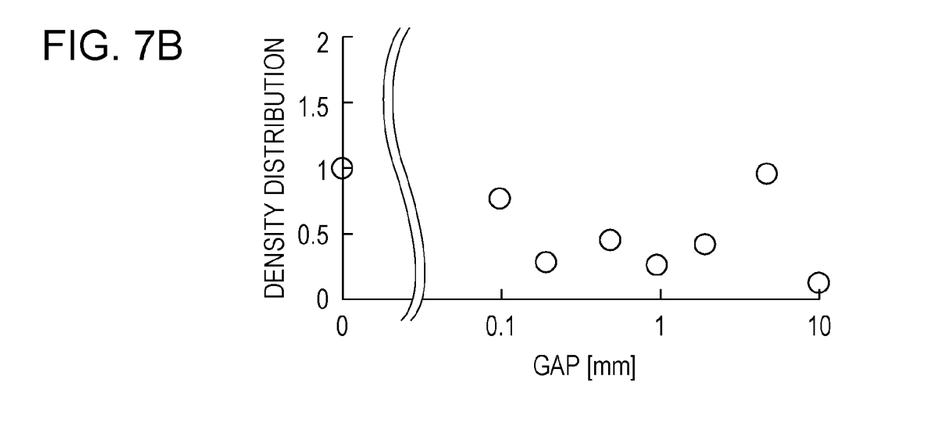
Figure 7C:
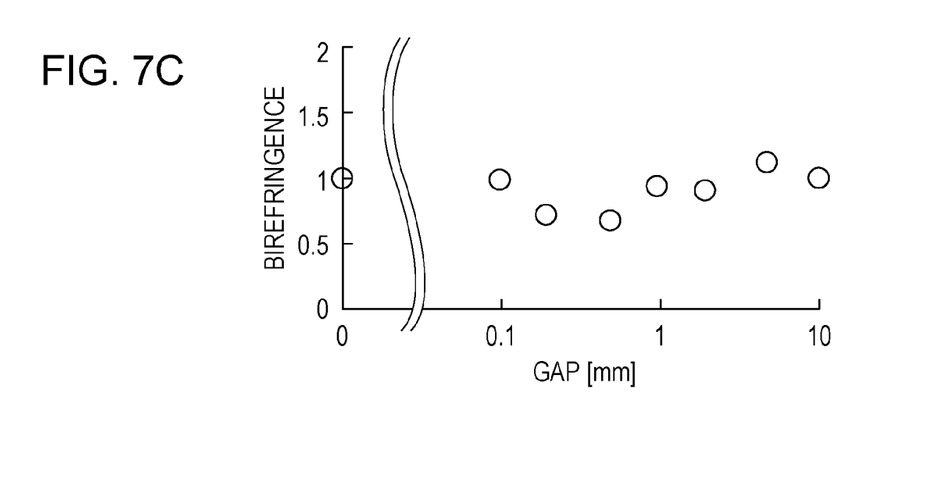

Although an advantage of the present invention can be obtained when the gap is present anywhere between the transfer surface of the mold 2 and the surface of the substrate 21, heat escapes through a contact therebetween. Therefore, the entire surface of the substrate 21 is preferably out of contact with the transfer surface of mold 2. That is, the entire surface of the substrate 21 is preferably not in contact with the transfer surface of mold 2. A gap ranging from 100 μm to 10 mm is present between the transfer surface of the mold 2 and the surface of the substrate 21 during infrared irradiation. The gap between the transfer surface of the mold 2 and the surface of the substrate 21 on the press axis is preferably 100 μm to 10 mm. Heating can be efficiently performed and an optical component with higher optical performance can be formed in such a manner that the surface 211 of the substrate 21 is heated by infrared irradiation under the presence of the gap ranging from 100 μm to 10 mm during heating. FIG. 6 shows the relationship between the gap between the mold 2 and the substrate 21 during heating and the change in temperature of the substrate 21 irradiated with infrared light. With reference to FIG. 6, the symbol ○ denotes the change in temperature of the surface 211 of the substrate 21 and the symbol □ denotes the difference in temperature between the surface and an inner portion of the substrate 21. When the gap between the mold 2 and the substrate 21 during heating is small, the gap therebetween does not sufficiently serve as a heat insulating layer. When the gap therebetween is large, infrared light diffuses in the gap therebetween and therefore the effect of heating is slight. The presence of the gap, ranging from 100 µm to 10 mm, therebetween allows the surface of substrate 21 to be more efficiently heated as compared with the case heating the surface 211 of the substrate 21 in contact with the mold 2. The intensive heating of the surface 211 of the substrate 21 prevents the increase in internal temperature of the substrate 21 and therefore reduces the time taken for cooling, thereby enabling the reduction of the molding time. FIGS. 7A, 7B, and 7C show the evaluation results of the form error, density distribution, and birefringence, respectively, of the surface of the molded substrate 21. The value obtained by heating the surface 211 of the substrate 21 in contact with the mold 2 and then molding the substrate 21 is used as a reference value. For, for example, form error, the quotient obtained by dividing the maximum form error caused by performing heating and molding with a gap of 0.1 mm by the maximum form error caused by performing heating and molding in a contact state is denoted as the form error at a gap of 0.1 mm. Likewise, for density distribution, the quotient obtained by dividing the density difference obtained by performing heating and molding with a gap of 0.1 mm by the density difference obtained by performing heating and molding in a contact state is denoted as the density distribution at a gap of 0.1 mm. For birefringence, the quotient obtained by dividing the birefringence phase difference obtained by performing heating and molding with a gap of 0.1 mm by the birefringence phase difference obtained by performing heating and molding in a contact state is denoted as the birefringence at a gap of 0.1 mm. In the case where the gap ranging from 100 µm to 10 mm is present during heating, the density distribution and birefringence of an inner portion of a molded product are found to be more improved as compared with the case of heating the surface 211 of the substrate 21 in contact with the mold 2. Thus, when the gap between the mold 2 and the surface 211 of the substrate 21 during heating is 100 µm to 10 mm, heating can be efficiently performed and an optical element with higher optical performance can be formed in such a manner that the surface 211 of the substrate 21 is heated by infrared irradiation.

Figure 8:
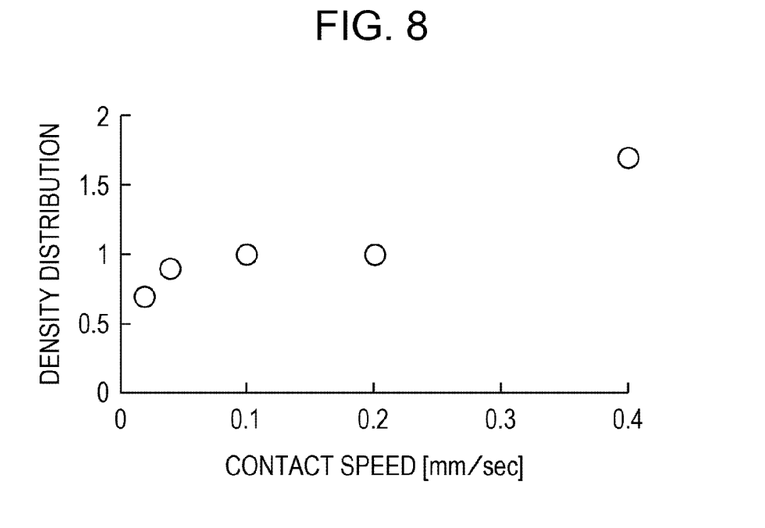
FIG. 8 is an illustration of the relationship between the speed of bringing a mold and a substrate into contact with each other and an optical component.

When the speed of bringing the mold 2 and the substrate 21 into contact with each other is 0.2 mm/s or less, a molded product with a good density distribution can be obtained. FIG. 8 shows the evaluation results of the speed of bringing the mold 2 and the substrate 21 into contact with each other and the density distribution of an inner portion of the molded substrate 21. The value of the density distribution obtained at a speed of 0.1 mm/s during contact is used as a reference value. For example, the quotient obtained by dividing the density difference obtained by performing molding at a contact speed of 0.2 mm/s by the density difference obtained by performing molding at a contact speed of 0.1 mm/s is plotted as the density distribution at a contact speed of 0.2 mm/s. When the speed is 0.2 mm/s or less, a molded product with a good density distribution is obtained. A reduction in the speed during contact allows the substrate 21 to be smoothly pressed against the mold 2, thereby bringing the substrate 21 and the mold 2 into tight contact with each other. Thus, no unnecessary stress is applied to the substrate 21 and therefore the density distribution of a molded product can be suppressed, thereby enabling the formation of an optical element or component with high optical performance.

Figure 9:
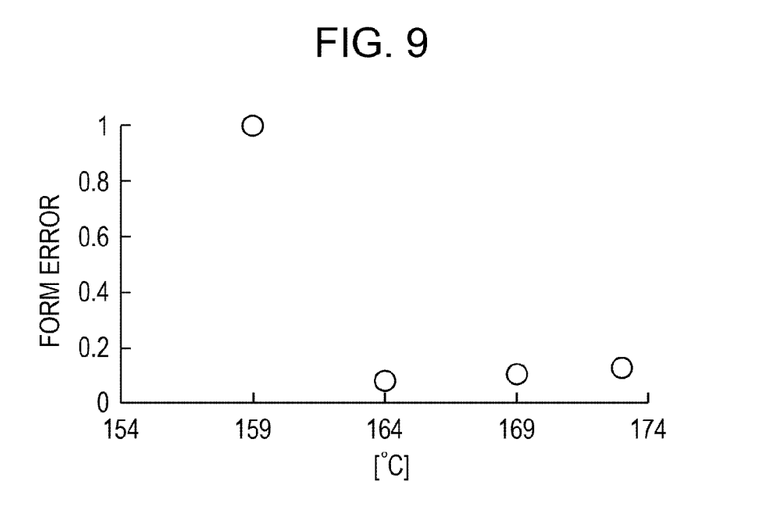
FIG. 9 is an illustration of the relationship between the surface temperature of a substrate and the form error of an optical component.

After the surface 211 of the substrate 21 reaches a predetermined temperature, the mold 2 is brought into contact with the surface 211 of the substrate 21. The predetermined temperature is preferably equal to or higher than the moldable temperature. The moldable temperature is 25° C. higher than the glass transition temperature of the substrate 21. When the substrate 21 is made of the glass material or plastic material covered with the plastic material or a plastic material covered with the plastic material, the moldable temperature is 25° C. higher than the glass transition temperature of the plastic material. FIG. 9 shows the relationship between the surface temperature of the substrate 21 and the form error of the molded substrate 21. An example using a material, ZEONEX® (a glass transition temperature of 139° C.), available from ZEON Corporation is shown herein. The abscissa represents the temperature relative to the glass transition temperature (Tg) of the substrate 21 and the ordinate represents the form error of the substrate 21. The value of the form error of the substrate 21 that has been heated to 159° C. (a temperature 20° C. higher than the glass transition temperature) thereof and then molded is used as a reference value. For example, the quotient obtained by dividing the maximum form error obtained by heating to 164° C. (a temperature 25° C. higher than the glass transition temperature) by the maximum form error obtained by heating to 159° C. (a temperature 20° C. higher than the glass transition temperature) is plotted as the form error at 164° C. (a temperature 25° C. higher than the glass transition temperature). In the case of heating the substrate 21 to 164° C. (a temperature 25° C. or more higher than the glass transition temperature) thereof, a molded product with good transfer can be obtained. The viscosity of resin decreases greatly at a temperature equal to or higher than the glass transition temperature thereof. The shape of the transfer surface of the mold 2 can be accurately transferred to the substrate 21 in such a manner that the substrate 21 is molded after the substrate 21 reaches a temperature of 25° C. or more higher than the glass transition temperature (Tg) thereof. Since any unnecessary stress need not be applied to the substrate 21, the density distribution and birefringence of the optical component is suppressed.

Second Embodiment

Figure 2A:
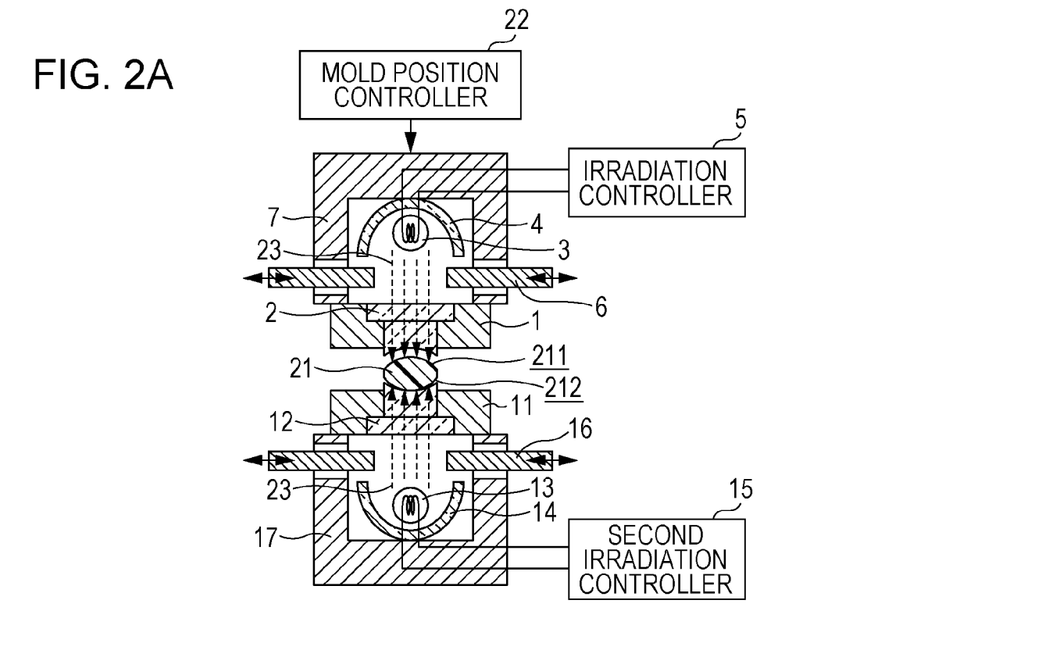
FIGS. 2A and 2B are illustrations of an apparatus for manufacturing an optical component according to a second embodiment the present invention.
Figure 2B:
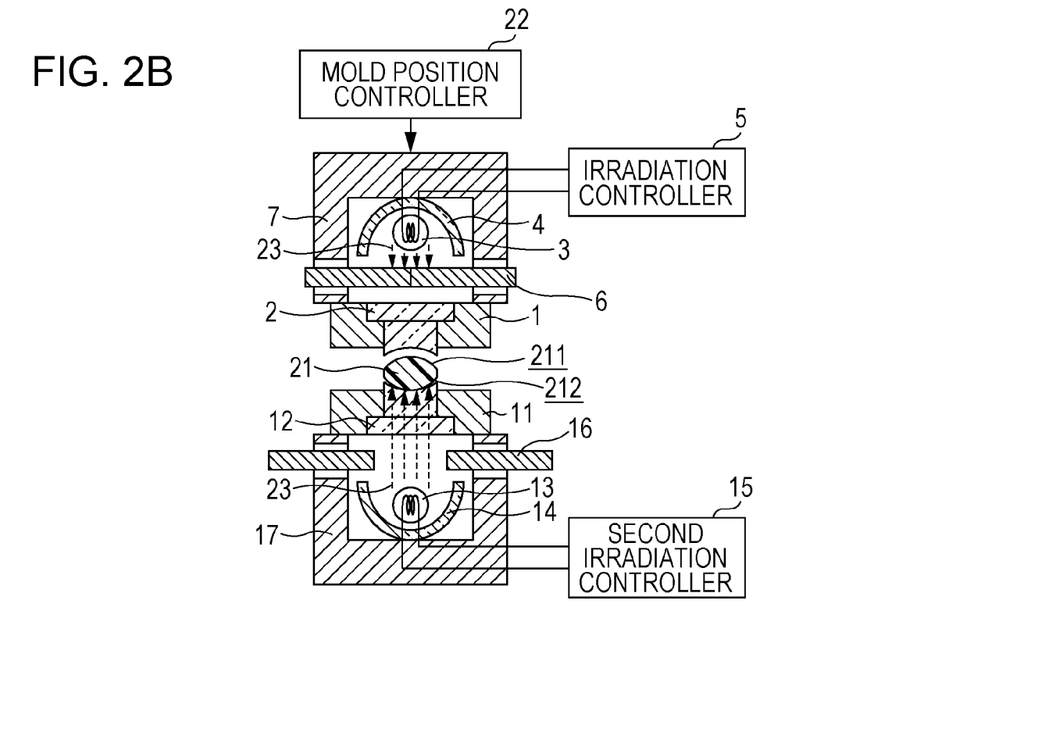

An apparatus for manufacturing an optical component according to a second embodiment of the present invention will now be described with reference to FIGS. 2A and 2B. FIGS. 2A and 2B illustrate a schematic view of a press molding machine corresponding to the apparatus according to the second embodiment. In FIGS. 2A and 2B, the same portions as those shown in FIGS. 1A and 1B are denoted by the same reference numerals. Thus, reference numerals already described as those used in FIG. 1 will not be described in detail. In this embodiment, the surface 211 of the substrate 21 described in the first embodiment is shaped and a second surface 212 of the substrate 21 that is opposite to the first surface 211 thereof is also shaped with a second mold 12.

With reference to FIG. 2A, the second mold 12 is placed on the opposite side of the substrate 21 from the mold 2. The second surface 212 of the substrate 21 is shaped with the second mold 12. The second mold 12 includes at least one portion made of an infrared transmitting material (for example, quartz glass). The second mold 12 is retained with a second mold support 11 and is attached to a second press unit 17. The second press unit 17 includes a second infrared irradiator 13 including a carbon lamp. An infrared ray 23 (infrared energy beam) emitted from the second infrared irradiator 13 is directed to the second mold 12 by a second condenser mirror 14 and is thereby applied to the second surface 212 of the substrate 21, which is made of resin.

The intensity of the infrared ray 23 is controlled with a second irradiation controller 15 and the irradiation of the substrate 21 with the infrared ray 23 is controlled by the switching operation of a second shutter 16 in an on/off manner. For illustration purposes, irradiation controller 15 is shown as a separate (i.e., second) irradiation controller. I should be appreciated, however, that irradiation controller 15 and the second irradiation controller 15 can be implemented as a single component including a central processing unit (CPU), such as a microprocessor or the like. Moreover, mold position controller 22 may also be implemented in a similar manner as a CPU or microprocessor either independently or combined with irradiation controller 5 and/or second irradiation controller 15.

The substrate 21 is a near shaped gob that has a shape similar to the shapes of both surfaces of the optical component, which is a molded product having transfer surfaces transferred from the mold 2 and the second mold 12. The near shaped gob is annealed in advance such that the density distribution and birefringence thereof are reduced. The use of the near shaped gob, which has low density distribution and birefringence, allows a molded product with high optical performance to be obtained.

When the second surface 212 of the substrate 21 is convex, the second surface 212 thereof has a radius of curvature less than the radius of curvature of a transfer surface of the second mold 12. When the second surface 212 of the substrate 21 is concave, the second surface 212 thereof has a radius of curvature greater than the radius of curvature of a transfer surface of the second mold 12. This allows a portion of the second surface 212 of the substrate 21 to be initially transferred, the portion being on a press axis, and allows the transfer surface of the second mold 12 to expand when the transfer surface of the second mold 12 is brought into contact with and pressed against the second surface 212 of the substrate 21. Thus, molding can be completed without causing any air accumulation between the substrate 21 and the mold 2, and therefore an optical component with high form accuracy can be obtained. When the substrate 21 is placed on the second mold 12, the substrate 21 and the second mold 12 are in point contact with each other; hence, a heat insulating layer of gas is allowed to be present between the second mold 12 and the substrate 21. Thus, a surface of the substrate 21 that is located on the second mold 12 side can be efficiently heated.

The substrate 21 may have any one of a biconvex shape, a biconcave shape, a plano-convex shape, a plano-concave shape, a convex meniscus shape, a concave meniscus shape, and a tabular shape (tablet shaped).

When the mold 2 and the second mold 12 are brought into close contact with and pressed against the substrate 21, portions of both molding surfaces of the substrate 21 are initially transferred, the portions being on the press axis, and the transfer surfaces of the mold 2 and the second mold 12 expand. Thus, molding can be completed without causing any air accumulation and therefore an optical component with high form accuracy can be obtained. The surface profile of the substrate 21 and others are substantially the same as those described in the first embodiment.

The second mold 12 may be made of an infrared transmitting material. The second mold 12 may be made of, for example, one selected from the group consisting of quartz glass, silicon, $CaF_2$, $MgF_2$, $BaF_2$, Ge, ZnSe, ZnS, KBr, and sapphire or a mixture of two or more selected from this group.

The second infrared irradiator 13 preferably includes the carbon lamp. The second infrared irradiator 13 may include a halogen lamp, Kanthal heater, or ceramic heater having a peak wavelength of 1 μm to 4 μm instead of the carbon lamp.

A method of manufacturing an optical component according to this embodiment will now be described.

Before a molding step is started, the shutter 6 and the second shutter 16 are closed and the infrared irradiator 3 and the second infrared irradiator 13 are turned on in advance. The substrate 21 is provided on the second mold 12 and is set to be in point contact with the second mold 12 on the press axis.

The start of manufacture allows the press unit 7 to be moved downward with the mold position controller 22 and allows the mold 2 to approach the substrate 21. The press unit 7 stops when a gap between the mold 2 and the substrate 21 approaches 500 μm on the press axis.

As shown in FIG. 2B, the substrate 21 is irradiated with the infrared ray 23 through the second mold 12 by opening the second shutter 16, whereby the second surface 212 of the substrate 21 that is located on the second mold 12 side is heated.

The substrate 21 is irradiated with the infrared ray 23 through the mold 2 by opening the shutter 6, whereby the surface 211 of the substrate 21 that is located on the mold 2 side is heated. A predetermined gap (for example, a 500 μm gap) is present between the mold 2 and the substrate 21; however, the second mold 12 and the substrate 21 are in point contact with each other on the press axis and therefore the effect of heat insulation by gas is low. Thus, the increase in temperature of the second surface 212 of the substrate 21 is less than the increase in temperature of the surface 211 thereof. Therefore, the second shutter 16 is opened first and is adjusted such that the surface 211 and second surface 212 of the substrate 21 simultaneously reach a moldable temperature. After both surfaces of the substrate 21 simultaneously reach the moldable temperature, the shutter 6 and the second shutter 16 are closed and a heating step is ended. This operation allows the difference in temperature distribution and the difference in transferability between the surface 211 and second surface 212 of the substrate 21 to be eliminated.

Just before the surface 211 of the substrate 21 that is located on the mold 2 side reaches the moldable temperature, that is, a temperature 25° C. higher than the glass transition temperature of the substrate 21, the mold 2 is brought close to the substrate 21 at the speed (for example, 0.5 mm/s) during approach and a gap between the mold 2 and the substrate 21 is adjusted to the gap (for example, 100 μm or less) during approach. This operation allows the heated substrate 21 to be smoothly subjected to a pressing step. After heating is ended, the mold 2 is brought into contact with the substrate 21 at the speed (for example, 0.02 mm/s) during contact. The mold 2 is pressed against the surface 211 of the substrate 21 and the second mold 12 is pressed against the second surface 212 thereof, whereby the shape of a transfer surface of the mold 2 is transferred to the surface 211 of the substrate 21 and the shape of a transfer surface of the second mold 12 is transferred to the second surface 212 of the substrate 21.

Although an advantage of the present invention can be obtained when the gap is present anywhere between the transfer surface of the mold 2 and a surface of the substrate 21, heat escapes through a contact therebetween and therefore the heat insulating effect of gas is low. Therefore, the entire surface of the substrate 21 is preferably out of contact with the transfer surface of mold 2. That is, the entire surface of the substrate 21 is preferably not in contact with the transfer surface of mold 2. A gap ranging from 100 μm to 10 mm is present between the transfer surface of the mold 2 and a surface of the substrate 21 during infrared irradiation. The gap between the transfer surface of the mold 2 and the surface of the substrate 21 on the press axis is preferably 100 μm to 10 mm. Heating can be efficiently performed and an optical element with higher optical performance can be formed in such a manner that the surface 211 of the substrate 21 is heated by infrared irradiation under the presence of the gap ranging from 100 μm to 10 mm during heating.

When the speed of bringing the mold 2 and the substrate 21 into contact with each other is 0.2 mm/s or less likewise the first embodiment, a molded product with a good density distribution can be obtained.

Other manufacturing steps are substantially the same as those described in the first embodiment.

Third Embodiment

Figure 3A:
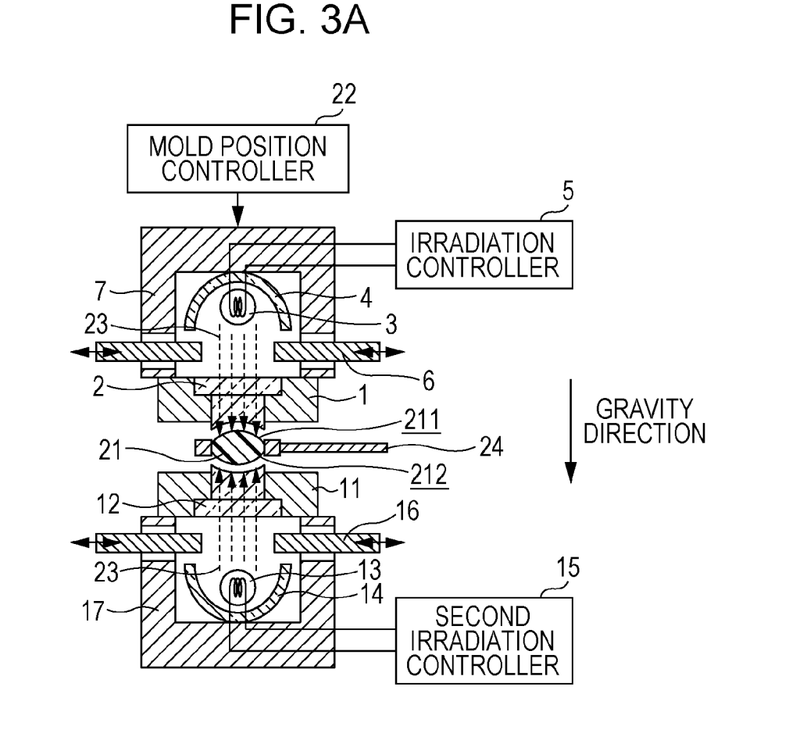
FIGS. 3A and 3B are illustrations of an apparatus for manufacturing an optical component according to a third embodiment the present invention.
Figure 3B:
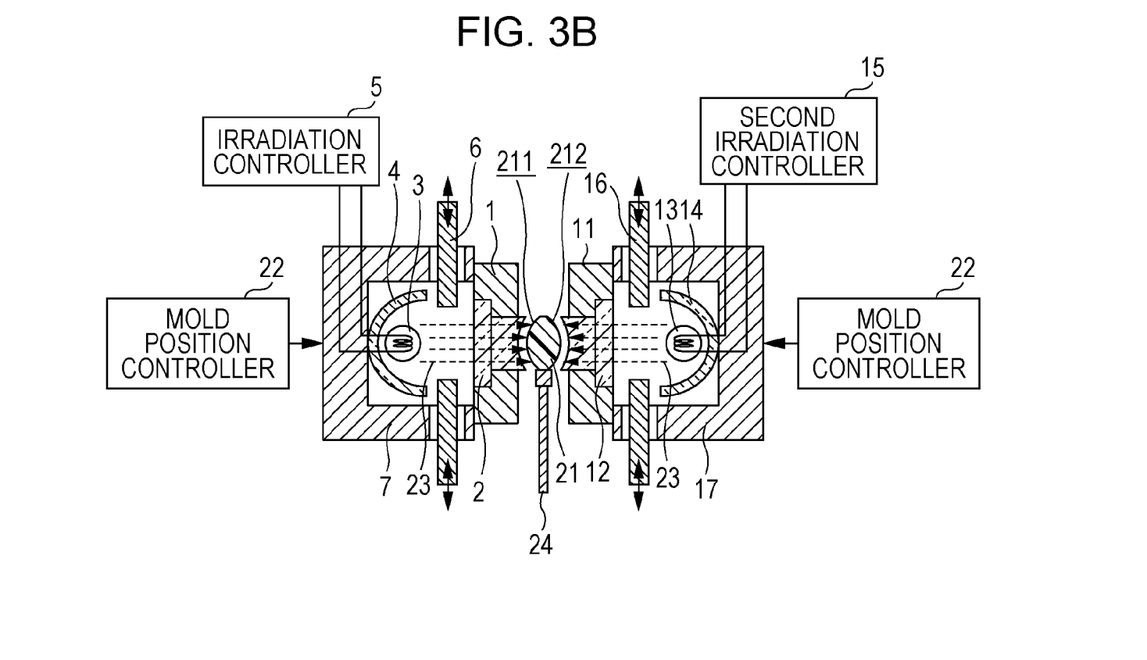

An apparatus for manufacturing an optical component according to a third embodiment of the present invention will now be described. FIG. 3 is a schematic view of a press molding machine corresponding to the apparatus according to the third embodiment. The same portions as those shown in FIG. 2 are denoted by the same reference numerals as those used in FIG. 2 and will not be described in detail. In this embodiment, an automatic hand 24 (e.g., robotic positioned) holds and positions a substrate 21. Other components are substantially the same as those described in the second embodiment. A method of manufacturing an optical component according to this embodiment is described below.

Before manufacturing steps are started, a shutter 6 and a second shutter 16 are closed and an infrared irradiator 3 and a second infrared irradiator 13 are turned on in advance.

The automatic hand 24 is suspended in such a state that the substrate 21 is held by the automatic hand 24 and the gap (for example, a 500 μm gap) during heating is present between a second mold 12 and a second surface 212 of the substrate 21 on a press axis.

The start of manufacture allows a press unit 7 to be moved downward with a mold position controller 22 and allows a mold 2 to approach the substrate 21. The press unit 7 stops when the gap between the mold 2 and a surface 211 of the substrate 21 approaches the gap (for example, 500 μm) during heating on the press axis.

The surface 211 of the substrate 21 is irradiated with an infrared ray 23 through the mold 2 by opening the shutter 6 and the second surface 212 of the substrate 21 is irradiated with an infrared ray 23 through the second mold 12 by opening the second shutter 16, whereby both surfaces of the substrate 21 are heated. Although an advantage of the present invention can be obtained when the gap (the gap during heating) is present anywhere between the transfer surface of the mold 2 and the surface 211 of the substrate 21 as described in the first embodiment, heat escapes through a contact therebetween and therefore the heat insulating effect of gas is low. Therefore, the entire surface of the substrate 21 is preferably out of contact with the transfer surface of mold 2. That is, the entire surface of the substrate 21 is preferably not in contact with the transfer surface of mold 2. A gap ranging from 100 μm to 10 mm is present between the transfer surface of the mold 2 and a surface of the substrate 21 during infrared irradiation. The gap between the transfer surface of the mold 2 and the surface of the substrate 21 on the press axis is preferably 100 μm to 10 mm.

Likewise, although an advantage of the present invention can be obtained when the gap (the gap during heating) is present anywhere between the transfer surface of the mold 2 and the second surface 212 of the substrate 21, heat escapes through a contact therebetween and therefore the heat insulating effect of gas is low. Therefore, the entire second surface 212 of the substrate 21 is preferably out of contact with the transfer surface of mold 2. That is, the entire second surface 212 of the substrate 21 is preferably not in contact with the transfer surface of mold 2. A gap ranging from 100 μm to 10 mm is present between the transfer surface of the mold 2 and a surface of the substrate 21 during infrared irradiation. The gap between the transfer surface of the mold 2 and the surface of the substrate 21 on the press axis is preferably 100 μm to 10 mm. Heating can be efficiently performed and an optical element with higher optical performance can be formed in such a manner that the surface 211 or 212 of the substrate 21 is heated by infrared irradiation under the presence of the gap ranging from 100 μm to 10 mm during heating.

Just before both surfaces of the substrate 21 reach a moldable temperature that is 25° C. higher than the glass transition temperature of the substrate 21, the mold 2 is brought close to the substrate 21 at a predetermined speed (for example, 0.5 mm/s) and the gap between the mold 2 and the substrate 21 is adjusted to a predetermined value (for example, 100 μm or less). At the same time, the substrate 21 is brought close to the second mold 12 by operating the automatic hand 24 and the gap between the substrate 21 and the second mold 12 is adjusted to a predetermined value (for example, 100 μm or less).

This operation allows the heated substrate 21 to be smoothly subjected to a pressing step. After both surfaces of the substrate 21 reach the moldable temperature, the shutter 6 and the second shutter 16 are closed, whereby heating is ended. After heating is ended, the mold 2 is brought into contact with the substrate 21 at a predetermined speed (for example, 0.02 mm/s) and is pressed against the surface 211 of the substrate 21 by operating the mold position controller 22 and the automatic hand 24. At the same time, the second mold 12 is brought into contact with the substrate 21 at a predetermined speed (for example, 0.02 mm/s) and is pressed against the second surface 212 of the substrate 21. The shape of the transfer surface of the mold 2 is transferred to the surface 211 of the substrate 21 and the shape of the transfer surface of the second mold 12 is transferred to the second surface 212 of the substrate 21.

When the speed of bringing the mold 2 and the substrate 21 into contact with each other is 0.2 mm/s or less, a molded product with a good density distribution can be obtained. When the speed of bringing the second mold 12 and the substrate 21 into contact with each other is 0.2 mm/s or less, a molded product with a good density distribution can be also obtained.

Other manufacturing steps are substantially the same as those described in the first embodiment.

FIG. 3A illustrates that the substrate 21, the mold 2, and the second mold 12 are coaxially arranged in a gravity direction. The substrate 21, the mold 2, and the second mold 12 may be coaxially arranged in a direction other than the gravity direction. The substrate 21, the mold 2, and the second mold 12 may be coaxially arranged in, for example, a direction perpendicular to the gravity direction as shown in FIG. 3B.

Furthermore, a second mold position controller for moving the second mold 12 may be used. A predetermined gap may be provided between the second mold 12 and the substrate 21 by driving the second mold position controller.

Fourth Embodiment

Figure 12:
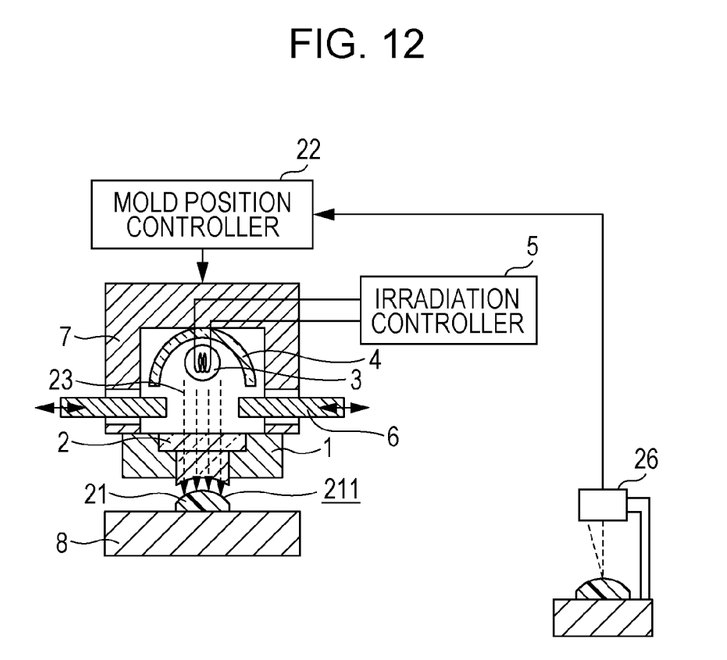
FIG. 12 is an illustration of an apparatus for manufacturing an optical component according to a fourth embodiment the present invention.

FIG. 12 is a schematic view of a press molding machine corresponding to an apparatus for manufacturing an optical component according to a fourth embodiment of the present invention. The same portions as those shown in FIG. 1 are denoted by the same reference numerals as those used in FIG. 1 and will not be described in detail. With reference to FIG. 12, reference numeral 26 represents a thickness meter for measuring the thickness of a substrate 21. In this embodiment, even if the thickness of the substrate 21 varies, the stop position of a mold 2 is adjusted on the basis of the thickness of the substrate 21 as determined with the thickness meter 26 such that a gap between the mold 2 and a surface 211 of the substrate 21 is kept within a predetermined range (the range of, for example, ±10 µm with respect to a preset value). A predetermined portion of the unmolded substrate 21 is measured for thickness with the thickness meter 26 and information about the thickness of the substrate 21 is transmitted to a mold position controller 22. The measured portion may be a central or edge portion of the substrate 21. A portion of the substrate 21 that has a surface perpendicular to the direction of measurement is preferably measured such that the error of measurement is small. The thickness meter 26 may be a laser displacement meter, a linear gauge, a micrometer, or the like. From the information, transmitted from the thickness meter 26, about the thickness of the substrate 21, the shape of the mold 2, and the shape of a press unit 7, the mold position controller 22 calculates a position at which the press unit 7 is brought into contact with the substrate 21 by moving the press unit 7.

The gap between the substrate 21 and the mold 2 during heating can be controlled within the range of ±10 µm with respect to a preset value in such a manner that the press unit 7 is moved with the mold position controller 22 and is stopped at a position away from, by a predetermined distance, the position where the press unit 7 is brought into contact with the substrate 21.

The gap between the mold 2 and the surface 211 of the substrate 21 during heating is kept constant as described above and therefore the temperature distribution of the substrate 21 does not vary at the end of infrared irradiation even if the thickness of the substrate 21 used varies. The time from the end of infrared irradiation to the contact of the mold 2 with the substrate 21 is kept constant and therefore the temperature distribution of the substrate 21 can be kept constant at the start of transfer. As a result, the change in form error of a molded product can be reduced and a stable optical element can be obtained.

Figure 13A:
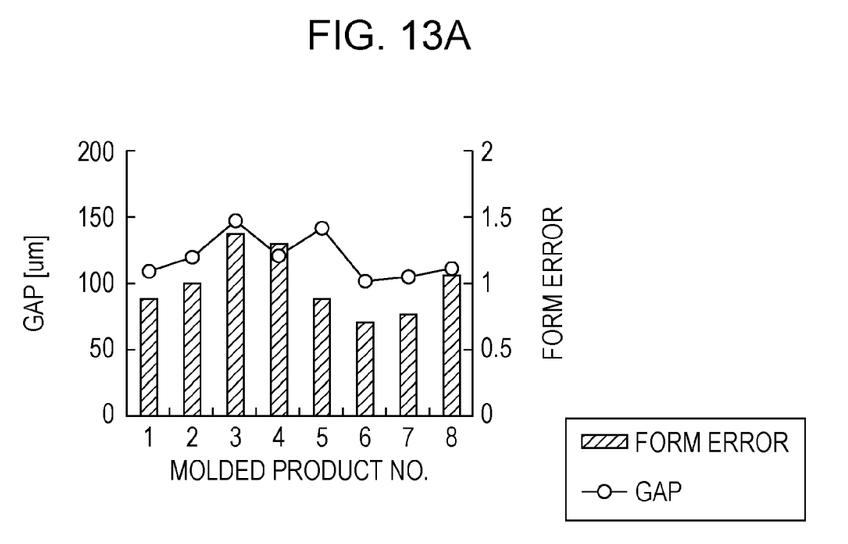
FIGS. 13A and 13B are illustrations of the change in gap and form error.
Figure 13B:
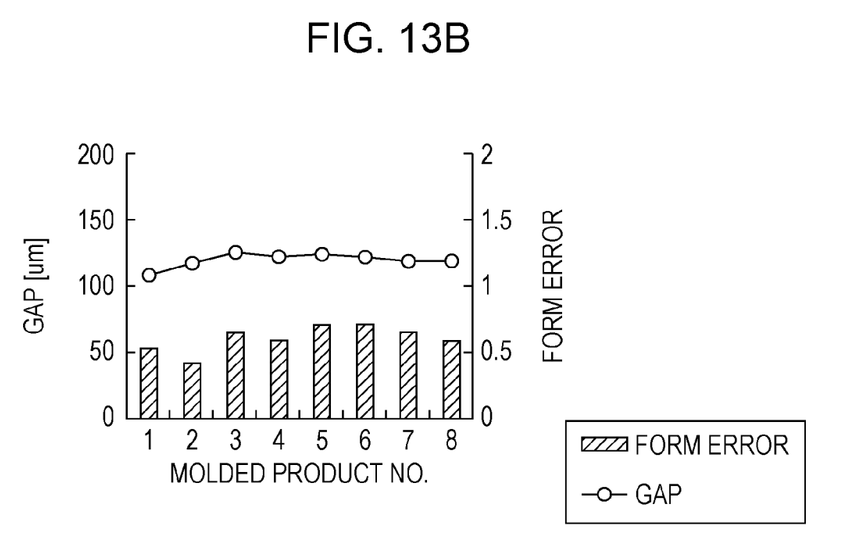

FIG. 13A shows the variation in form error of molded products between shots in the case of fixing the stop position of the mold 2. FIG. 13B shows the variation in form error of molded products between shots in the case of adjusting the stop position of the mold 2 on the basis of measurements obtained from the thickness meter 26. The symbol ○ denotes the size of the gap between the mold 2 and the surface 211 of the substrate 21 during heating and bars denote the form errors of molded products. The average of the form errors of Molded Product Nos. 1 to 9 is used as a reference value, the form errors being determined by fixing the stop position of the mold 2. For example, the quotient obtained by dividing the maximum form error of Molded Product No. 1 in the case of adjusting the stop position of the mold 2 by the average of the form errors of Molded Product Nos. 1 to 9 in the case of fixing the stop position of the mold 2 is plotted as the form error of Molded Product No. 1 in the case of adjusting the stop position of the mold 2.

In the case of fixing the stop position of the mold 2, the change in thickness of the substrate 21 leads directly to the change in the gap between the mold 2 and the surface 211 of the substrate 21 during heating to cause a variation between shots.

By adjusting the stop position of the mold 2 within the range of ±10 µm on the basis of the thickness of the substrate 21, a variation between shots can be significantly reduced and a highly accurate optical element can be stably obtained. As shown in FIG. 12, the substrate 21 is directly measured for thickness. The stop position of the mold 2 may be adjusted in such a manner that the unmolded substrate 21 is measured for weight instead of thickness and the thickness of a portion of the substrate 21 is calculated, the portion being determined on the basis of the density of the substrate 21, and information about the thickness thereof is transmitted to the mold position controller 22.

Fifth Embodiment

Figure 14A:
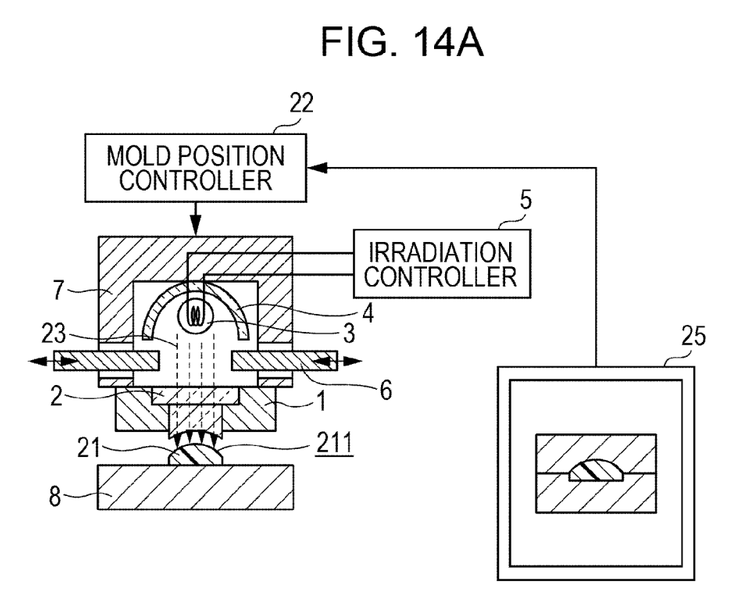
FIGS. 14A and 14B are illustrations of an apparatus for manufacturing an optical component according to a fifth embodiment the present invention and an apparatus for manufacturing an optical component according to a sixth embodiment the present invention.

An apparatus for manufacturing an optical component according to a fifth embodiment of the present invention will now be described. FIG. 14A is a schematic view of a press molding machine corresponding to the apparatus according to the fifth embodiment. The same portions as those shown in FIG. 1 are denoted by the same reference numerals as those used in FIG. 1 and will not be described in detail. In this embodiment, the stop position of a mold 2 is adjusted in such a manner that the thickness of a substrate 21 is determined from information about the position of a movable portion of a production unit, the position thereof being measured or detected in a step of producing the substrate 21. With reference to FIG. 14A, a substrate production unit 25 is configured to be capable of transmitting information about the position of a substrate-molding tool placed in the substrate production unit 25 to a mold position controller 22. The mold position controller 22 calculates the thickness of the substrate 21 from information about the position of the substrate-molding tool that is detected in the step of producing the substrate 21, which is placed on a substrate support 8. From the thickness of the substrate 21, the shape of the mold 2, and the shape of a press unit 7, the mold position controller 22 calculates a position at which the press unit 7 is brought into contact with the substrate 21 by moving the press unit 7.

The position of the substrate-molding tool is measured with a laser displacement meter, a linear gauge, or the like. Other components and operations are substantially the same as those described in the fourth embodiment.

Since the thickness of the substrate 21 is determined from the positional information measured or detected by the substrate production unit 25, any mechanism for measuring the thickness of the substrate 21 need not be used. Therefore, a highly accurate optical element can be stably obtained without an increase in manufacturing cost or cycle time.

In this embodiment, the thickness of the substrate 21 is determined from the information about the position of the substrate-molding tool, which is placed in the substrate production unit 25. In the case where the substrate 21 is produced in such a manner that, for example, resin is melted in a cylinder by heating and the melted resin is injected into the substrate-molding tool, the thickness of the substrate 21 may be determined by calculating the volume of the injected resin from the travel distance of the cylinder moved during injection and the inner diameter of the cylinder.

Sixth Embodiment

Figure 14B:
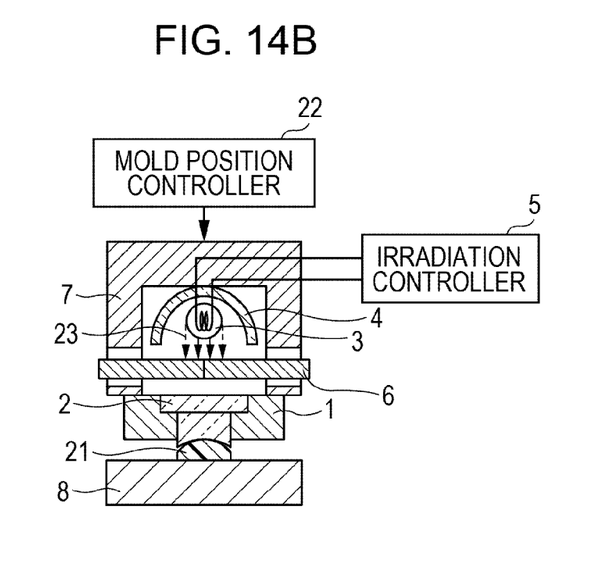

An apparatus for manufacturing an optical component according to a sixth embodiment of the present invention will now be described. FIG. 14B is a schematic view of a press molding machine corresponding to the apparatus according to the sixth embodiment. The same portions as those shown in FIG. 1 are denoted by the same reference numerals as those used in FIG. 1 and will not be described in detail. In this embodiment, the thickness of a substrate 21 is measured by bringing a mold 2 into contact with the substrate 21 in advance of infrared irradiation and the stop position of the mold 2 is adjusted.

After the substrate 21 unmeasured for thickness is set on a substrate support 8 and molding is then started, a press unit 7 is moved downward with a mold position controller 22 and the mold 2 approaches the substrate 21. After the mold 2 contacts the substrate 21, the mold 2 is stopped. The mold 2 is moved upward from the stop position thereof by a predetermined value (for example, 120 µm) and is then stopped again. This operation allows a gap between the mold 2 and a surface 211 of the substrate 21 to be kept constant during heating. Other components and operations are substantially the same as those described in the fourth embodiment.

Since the thickness of the substrate 21 is measured by bringing the mold 2 into contact with the substrate 21 in advance of infrared irradiation, any mechanism for measuring the thickness of the substrate 21 need not be used. Therefore, a highly accurate optical element can be stably obtained without an increase in manufacturing cost.

In each of the above descriptions with reference to FIGS. 12 to 14, one surface of the substrate 21 is shaped; however, a second press unit containing an infrared irradiator may be provided on the opposite side of the surface 211 of the substrate 21 instead of the substrate support 8 such that both surfaces of the substrate 21 can be shaped.

The substrate 21 and the mold 2 are arranged vertically as described above and may be arranged horizontally.

According to the present invention, the conventional problems can be solved. Furthermore, a method of manufacturing an optical component and an apparatus for manufacturing such an optical component can be provided, the method being capable of more significantly reducing the molding time as compared with conventional press molding methods and injection molding methods, the method and the apparatus being capable of stably manufacturing an optical element with excellent optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-202047 filed Sep. 9, 2010, which is hereby incorporated by reference herein in its entirety.

What is claimed is:

1. A method of manufacturing an optical component, comprising:
    bringing a first mold including at least one portion made of an infrared transmitting material towards a substrate so that a gap between the substrate and the first mold is from 100 µm to 10 mm;
    heating, in a state that the gap is present, a first surface of the substrate to a temperature 25° C. or more higher than a glass transition temperature of the substrate by irradiating the substrate with an infrared ray through the infrared transmitting material of the first mold;
    contacting the first mold with the substrate at a speed of 0.2 mm/sec or less; and
    placing the heated substrate and the first mold into tight contact with each other,
    wherein the substrate is a near shaped gob.

2. The method according to claim 1, wherein the first mold and a first surface of the substrate are brought into tight contact with each other by relatively moving the first mold and the substrate along on a press axis.

3. The method according to claim 1, wherein the infrared ray has a peak wavelength of 1 µm to 4 µm.

4. The method according to claim 1, wherein the first mold includes a curved transfer surface and the substrate includes a curved surface,
    wherein the curved surface of the substrate has a radius of curvature less than the radius of curvature of the transfer surface of the first mold when the curved surface is convex, and the curved surface of the substrate has a radius of curvature greater than the radius of curvature of the transfer surface of the first mold when the curved surface is concave.

5. The method according to claim 1, wherein the near shaped gob has been reduced in density distribution and birefringence by annealing.

6. The method according to claim 1, wherein the substrate is made of a glass material covered with a plastic material or a first plastic material covered with a second plastic material.

7. The method according to claim 1, wherein the first mold is made of one selected from the group consisting of quartz, silicon, $CaF_2$, $MgF_2$, $BaF_2$, Ge, ZnSe, ZnS, KBr, and sapphire or a mixture of two or more selected from this group.

8. The method according to claim 1, further comprising:
    bringing a second mold including at least one portion made of an infrared transmitting material towards the substrate,
    wherein the substrate has a second surface, the second surface is heated by irradiating the second surface with an infrared ray in a state that a gap is present between the second surface and a second mold, and
    placing the second mold into tight contact with the heated second surface.

9. The method according to claim 1, wherein the substrate has a second surface, the second surface is heated by irradiating the second surface with an infrared ray in a state that the second surface is disposed on a second mold including at least one portion made of an infrared transmitting material, and the second mold is brought into tight contact with the heated second surface.

10. The method according to claim 1, wherein the step of placing the heated substrate and the first mold into tight contact with each other includes pressing a transfer surface of the first mold against an outer surface of the substrate such that a shape of the transfer surface is transferred to the outer surface of the substrate.

11. The method according to claim 10, further comprising:
    cooling the substrate by transferring heat off the substrate to the first mold, and
    separating the substrate from the first mold after the substrate has been cooled.

* * * * *